US006164674A

United States Patent [19]

Rogers et al.

[11] Patent Number: 6,164,674

[45] Date of Patent: Dec. 26, 2000

[54] ADJUSTABLE WHEELBASE WHEELCHAIR

[75] Inventors: Richard H. Rogers, San Antonio, Tex.; Robert M. Huntress, San Diego, Calif.

[73] Assignee: Adorno/Rogers Technology, Inc., Austin, Tex.

[21] Appl. No.: 09/067,511

[22] Filed: Apr. 27, 1998

Related U.S. Application Data

[63] Continuation-in-part of application No. 08/463,201, Jun. 5, 1995, Pat. No. 5,782,483.

[51] Int. Cl.[7] ........ B62M 1/14

[52] U.S. Cl. ........ 280/250.1; 280/42; 280/650; 297/45; 297/DIG. 4

[58] Field of Search ........ 297/44, 45, 53, 297/DIG. 4; 280/250.1, 42, 650, 47.38, 642

[56] References Cited

U.S. PATENT DOCUMENTS

| | | | |
|---|---|---|---|
| 314,327 | 3/1885 | Gerbracht | 280/42 |
| 567,669 | 9/1896 | Weinstock | 280/42 |
| 581,013 | 4/1897 | Serber et al. | 280/42 |
| 3,024,035 | 3/1962 | Tapiovaara | 280/42 X |
| 3,937,490 | 2/1976 | Mohamed | 280/242 WC |
| 4,007,947 | 2/1977 | Perego | 280/642 |
| 4,042,250 | 8/1977 | Rodaway | 280/42 |
| 4,046,374 | 9/1977 | Breyley | 280/42 X |
| 4,083,598 | 4/1978 | Thomas | 297/45 |
| 4,287,619 | 9/1981 | Brewer et al. | 4/483 |
| 4,324,410 | 4/1982 | Perego | 280/42 |
| 4,343,482 | 8/1982 | Wegner | 280/42 |
| 4,386,790 | 6/1983 | Kassai | 280/42 X |
| 4,462,604 | 7/1984 | Meyer | 280/242 WC |
| 4,577,878 | 3/1986 | Roy et al. | 280/242 WC |
| 4,598,921 | 7/1986 | Fenwick | 280/242 WC |
| 4,629,246 | 12/1986 | Fulton | 297/44 |
| 4,641,848 | 2/1987 | Ayers | 280/242 WC |
| 4,643,481 | 2/1987 | Saloff et al. | 297/458 |
| 4,648,619 | 3/1987 | Jungnell et al. | 280/650 |
| 4,712,830 | 12/1987 | Charbrol et al. | 297/42 |
| 4,779,878 | 10/1988 | Betts et al. | 280/42 |
| 4,779,885 | 10/1988 | Zinn | 280/289 WC |
| 4,861,056 | 8/1989 | Duffy, Jr. et al. | 280/250.1 |
| 4,863,181 | 9/1989 | Howle | 280/250.1 |
| 4,934,722 | 6/1990 | Goetzelman | 280/250.1 |
| 4,989,890 | 2/1991 | Lockard et al. | 280/42 |
| 5,064,211 | 11/1991 | Huttenhuis et al. | 280/250.1 |
| 5,076,390 | 12/1991 | Haskins | 280/250.1 |
| 5,141,250 | 8/1992 | Morgan et al. | 280/250.1 |
| 5,145,197 | 9/1992 | Gatti | 280/302.1 |
| 5,192,091 | 3/1993 | Liu | 280/644 |
| 5,217,239 | 6/1993 | Koet | 280/250.1 |
| 5,253,886 | 10/1993 | Weege | 280/39 |

(List continued on next page.)

FOREIGN PATENT DOCUMENTS

| | | | | |
|---|---|---|---|---|
| 34 35 990 A1 | 4/1986 | Germany | B62B 3/02 |
| WO 96-39320 | 12/1996 | WIPO | B62B 11/00 |

OTHER PUBLICATIONS

Pathfinder Enterprises, Incorporated, vol. 1 No. 1, *Open Doors*, Jan. 1995.

*Primary Examiner*—Michael Mar
*Attorney, Agent, or Firm*—Baker Botts L.L.P.

[57] ABSTRACT

A multi-wheeled vehicle having adjustable wheelbase dimensions. The preferred embodiment is a wheelchair which affords on-the-fly adjustment of width. The linkage between the two side frames of the present wheelchair is of two cross members in a horizontal X configuration, one end of each cross member being pivotally affixed to one side frame on one side of the wheelchair, with the respective other end of each cross member being slidably engaged with the opposite side frame. The cross members are pivotally attached to each other at a point of intersection. This structure allows a wheelchair of the present design to be easily expanded and contracted in width during use, with the rider in-place, and avoids the necessity of incremental changes between uses, such as is required by wheelchairs of present design. Yet, such a wheelchair is structurally quite stable with respect to any tendency of the side frames to toe-in under torque applied by weight on the seat.

12 Claims, 4 Drawing Sheets

U.S. PATENT DOCUMENTS

| | | | |
|---|---|---|---|
| 5,301,964 | 4/1994 | Papac | 280/250.1 |
| 5,301,970 | 4/1994 | Haskins | 280/250.1 |
| 5,328,183 | 7/1994 | Counts | 280/42 |
| 5,358,263 | 10/1994 | Aldus et al. | 280/42 |
| 5,496,050 | 3/1996 | Geiger et al. | 280/250.1 |
| 5,727,802 | 3/1998 | Garven, Jr. et al. | 280/250.1 |
| 5,755,455 | 5/1998 | Chen et al. | 280/642 |
| 5,857,688 | 1/1999 | Swearingen | 280/250.1 |
| 5,863,061 | 1/1999 | Ziegler et al. | 280/642 |
| 5,915,709 | 6/1999 | Radjenovic et al. | 280/250.1 |

ADJUSTABLE WHEELBASE WHEELCHAIR

CITATION TO PARENT APPLICATION

This is a continuation-in-part application with respect to U S. application Ser. No. 08/463,201, filed Jun. 5, 1995 issued as U.S. Pat. No. 5,782,483 on Jul. 21, 1998, with respect to which priority is claimed pursuant to 35 U.S.C. §120.

BACKGROUND OF THE INVENTION

1. Field of the Invention

The present invention relates to wheelchairs and other wheeled apparatuses having other than solely linear wheel arrays.

2. Background Information

Because wheelchairs must obviously have a high degree of stability for remaining upright when, for example, their users traverse sloped surfaces or effect rapid turns, traditional wheelchairs with fixed wheelbase dimensions are designed with suitably large wheelbase dimensions. A wheelchair with fixed wheelbase dimensions is an impediment to wheelchair users in many contexts. For example, maneuvering into small washrooms, around cramped office quarters, and through interior doors of most homes often makes access impossible. According to a survey by "Independent Living", it costs an average of $8000 to make an average home wheelchair accessible.

Another problem relating to excessive width of a standard wheelchair's wheelbase dimensions relates to air travel. Wheelchairs of standard dimension will not pass down an airliner aisle. This necessitates the transfer from one's regular wheelchair to one of the airline's uncomfortable and humiliating "people dollies."

These problems have been recognized, and attempts have been made to address the problem. There are, for example, wheelchairs the wheel base of which can be adjusted in width. However, such chairs as are adjustable in length and/or width are designed for incremental and semi-permanent adjustments, not for ad hoc, easily reversible, on-the-fly adjustments as for temporarily dealing with obstacles which either can only be, or can more easily be traversed by a narrower wheelchair.

There exists a need among wheelchair users (of which inventor, Richard Rogers, is one) for a wheelchair (1) which adjusts in wheelbase dimensions; and (2) is adjustable on-the-fly, by the user alone to a width no greater than the seat. Despite the hundreds of wheelchair designs on the market, or depicted in wheelchair related patents, not one appears to address these objectives in combination.

It is important to note that the design for the base of the wheelchair of the present invention has application beyond the field of wheelchairs. The novel expandable/retractable base design could be incorporated into any number of wheeled vehicles, carts, automobiles or other equipment for which it would be advantageous to provide an adjustable wheelbase, the operation of which need not affect the overlying remainder of the vehicles, etc. One example of an application of the present design which is extremely far afield of the wheelchair art would be that of an industrial crane. An expansive wheelbase is desirable for most cranes. However, the wheelbase dimensions are quite limited for a vehicle-based crane which must travel by roadways. The traditional solution for providing a more stable base is to use outriggers. This, however, impedes ready movement of the crane about a work site once the outriggers are extended.

Use of the subject base design would address this problem, as will be apparent following an exposition of the present design and its operation.

SUMMARY OF THE INVENTION

It is an object of the present invention to provide a novel and unobvious vehicular chassis the wheelbase dimensions of which are adjustable with respect to width.

It is another object of the present invention to provide a novel and unobvious wheelchair which provides for the adjustment of wheel base dimensions with respect to width.

It is another object of the present invention to provide a novel and unobvious wheelchair which permits on-the-fly adjustment of the width of the wheelbase.

It is another object of the present invention to provide a novel and unobvious wheelchair which permits on-the-fly, adjustment of the width of the wheelbase solely through application of compressive or expansive force to the wheels.

In satisfaction of these and related objectives, the present invention provides a novel design for a vehicular chassis the wheelbase dimensions of which are adjustable. The preferred embodiment of the present invention is as part of a wheelchair which permits its user to contract the wheelbase or traversing narrow passageways or fitting into small spaces.

DETAILED DESCRIPTION OF THE PREFERRED EMBODIMENT

Figure 1:
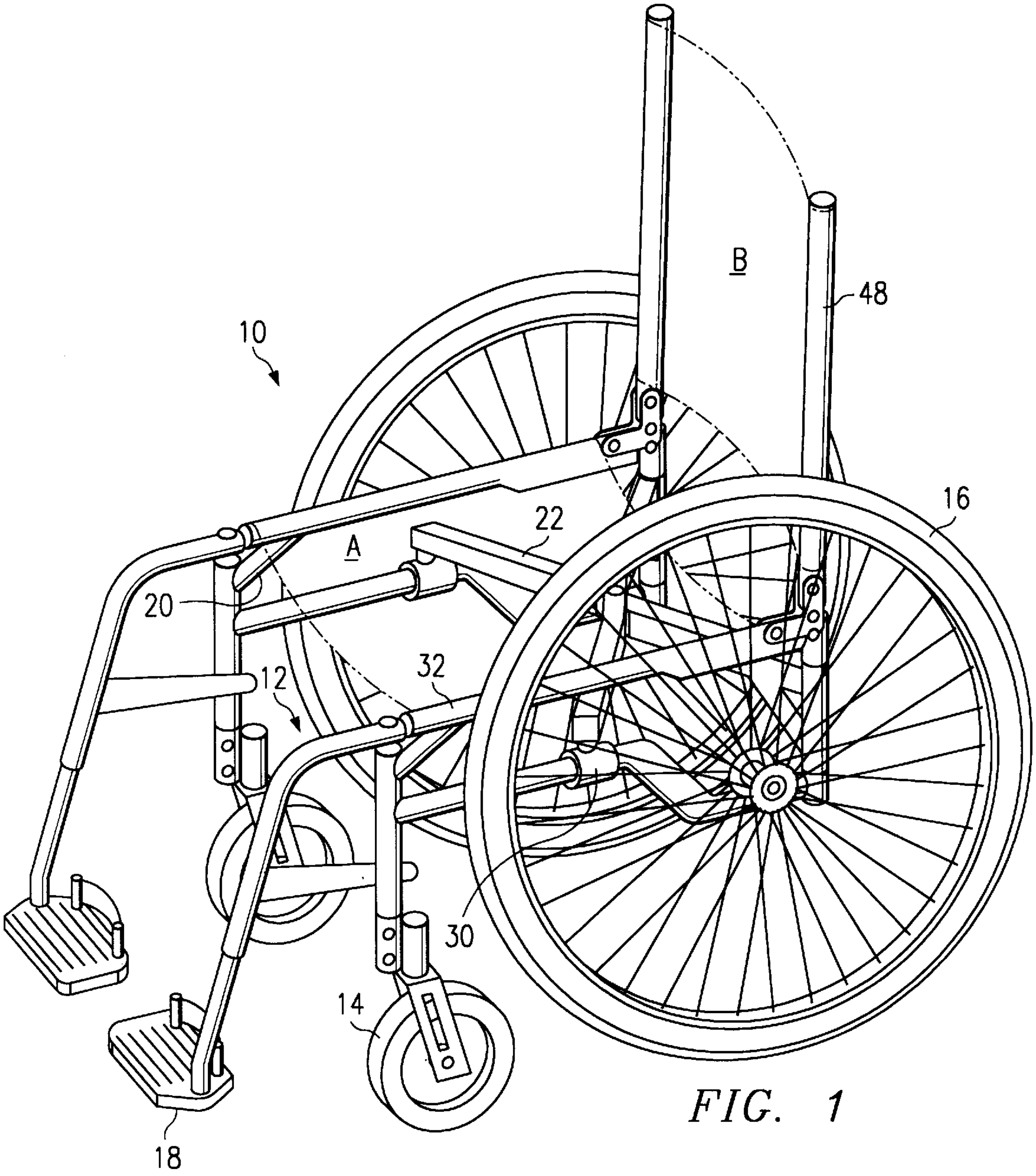
FIG. 1 is a perspective view of the preferred embodiment of the wheelchair of the present invention in an expanded configuration.
Figure 2:
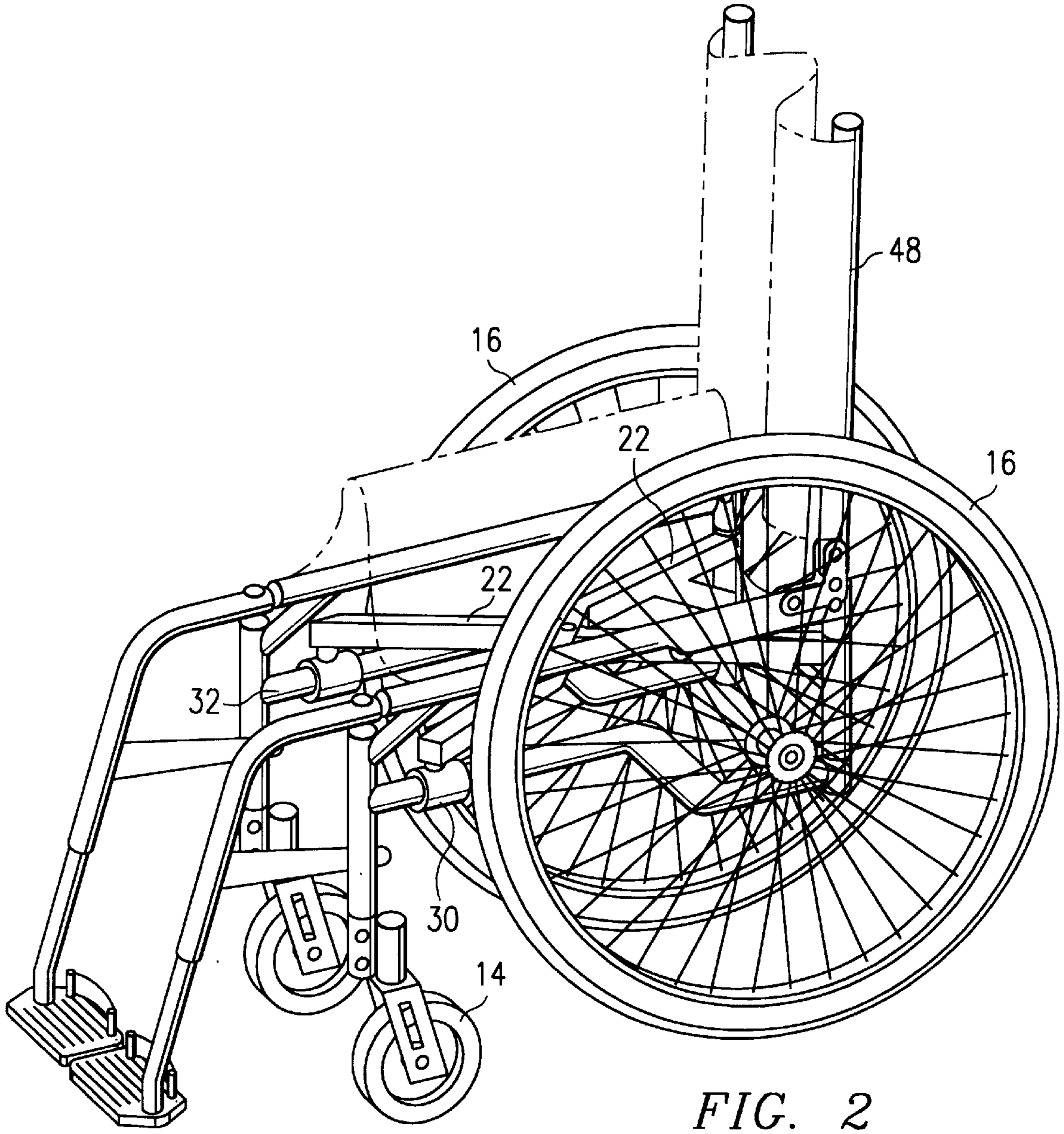
FIG. 2 is a perspective view of the preferred embodiment of the wheelchair of the present invention in a fully contracted configuration.

Referring to FIGS. 1 and 2, the wheelchair of the present invention is identified by the reference numeral 10. Wheelchair 10 will be used to demonstrate the present design for a vehicle base, but it is to be understood that, as mentioned above, the present invention has utility in fields quite unrelated to wheelchairs.

At its most basic level, wheelchair 10 may be described in terms of several basic operational component systems: a wheelchair frame 12 (to which are attached seat and back supports A and B for directly supporting a rider), forward caster wheels 14, primary wheels 16, and feet supports 18.

Figure 3:
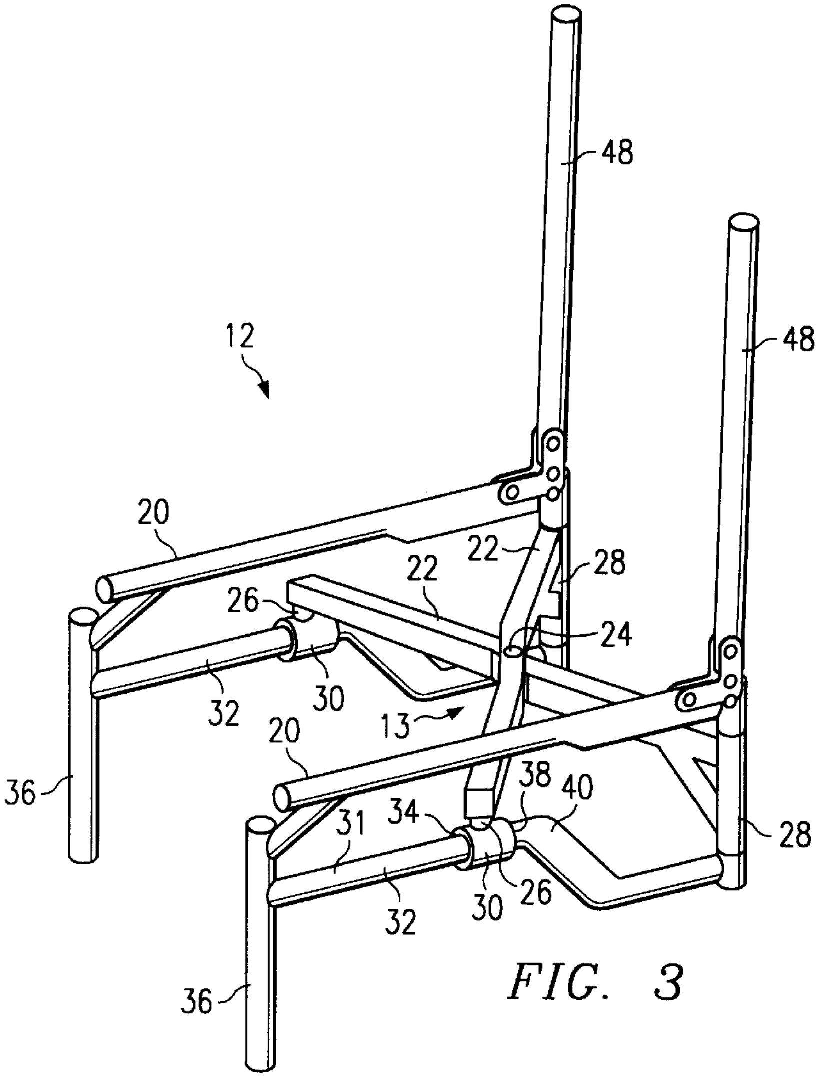
FIG. 3 is a perspective view of the basic frame portion of the wheelchair of the present invention (with wheels and seating removed) in an expanded configuration.
Figure 4:
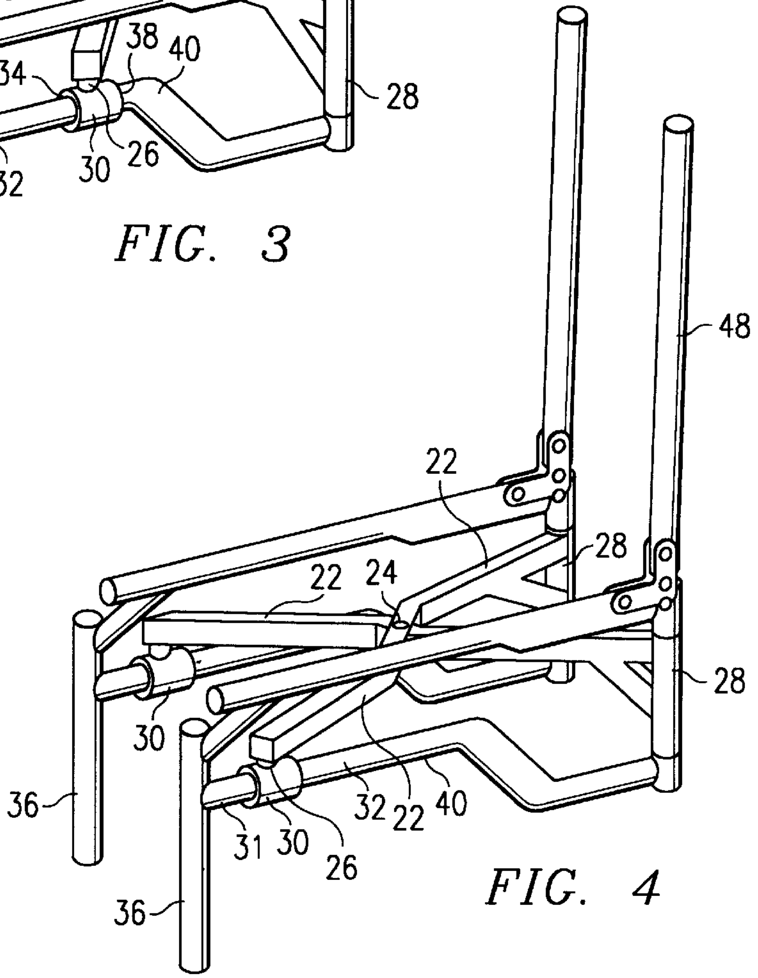
FIG. 4 is a perspective view of the basic frame portion of the wheelchair of the present invention (with wheels and seating removed) in a fully contracted configuration.

Referring primarily to FIGS. 3 and 4, wheelchair frame 12 includes two side frames 20 which are interconnected and mutually supported by way of a pair of scissor-action cross members 22 in an X configuration. Cross members 22 pivot, and are secured in a X, scissor-like configuration about, a hub 24. A forward end of each cross member 22 is pivotally attached to the forward cross member anchor blocks 26 of one side frame 20 of wheelchair frame 12, while a rearward end of each cross member 22 is rigidly attached to a rearward cross member anchor sleeve 28 of the opposite side of the wheelchair frame 12. In the preferred embodiment of the present invention, each rearward cross member anchor sleeve 28 is pivotally engaged with a stationary tubular segment (not visible in the drawings) of each respective side frame 20 to accommodate pivotal movement of cross members 22 (which are rigidly affixed thereto in the preferred embodiment) as side frames 20 move between expanded and contracted configurations (FIGS. 3 and 4 respectively). In the preferred embodiment, the frame segments to which rearward cross member anchor sleeves 28 are attached are oriented orthogonally relative to the plane within which cross members 22 sweep as they execute their scissor-like action.

Each forward cross member anchor block 26 is attached to a sliding cross member carriage 30 which is slidably engaged with a horizontal segment 32 of each side frame 20. Absent elaborate and unnecessary machinations to avoid such a configuration, horizontal segment 32 of each side frame should, as a practical matter, be oriented in parallel with the plane defined by the sweeps of cross members 22 and, when frame 12 is assembled, in parallel with the other horizontal segment 32. Such a configuration will allow the desired action of the cross members 22 and the resulting contracting and expanding movements of side frames 20.

A forward terminal segment 31 of horizontal segment 32 extends from the forward end 34 of cross member support carriage 30 and joins a wheel assembly support 36 (which carries forward caster wheels 14 at such an orientation as to support the frame 12 in a desired attitude in view of the diameter and relative position of the primary wheels 16 in respect of side frames 20.) Extending from the rearward end 38 of each cross member support carriage 30 is a rearward terminal segment 40 of horizontal segment 32.

It is to be understood that the absolute lengths of the segments of each horizontal segment 32 which constitute forward terminal segment 31, intermediate segment 33 (that portion of horizontal segments 32 which reside within cross member carriages 30), and rearward terminal segment 40 will, at any given time, vary depending on the extent to which the frame 12 is configured near its most expansive wheelbase configuration, or vice versa. The basis for this variation will be clear from a review of the following portions of this specification.

With reference primarily to FIGS. 3 and 4, it can be appreciated how frame 12 operates to simultaneously contract and expand the wheelbase dimensions with respect to width. As side frames 20 are drawn closer together through application of a compressive force, because the rearward cross member anchor sleeves 28 are not slidably engaged with any portion of side frames 20, and cannot, therefore, move linearly relative to horizontal segments 32, while cross member carriages 30 are slidably engaged with horizontal segments 32, cross member carriages 30 slide along horizontal segments 32 to compensate for the altered geometry of the more closely drawn together side frames 20. As a result of contraction of side frames 20, support carriages 30 slide along horizontal segments 30 away from the rearward anchor sleeves 28, and a portion of the thus far intermediate segments 33 and forward segments 31 of each horizontal segment 32 become rearwardly disposed relative to cross member carriages 30 (thereby becoming a part of the rearward terminal segment 40. The effect of the reverse operation (applying an expansive force to the side frames 20 to widen the chair's wheelbase) obviously has the reverse effect.

Notwithstanding the dynamics of this expanding and contracting of side frames 20, side frames 20 remain securely linked, and the structural integrity of the wheelchair frame 12 is not changed. The linkage between cross members 22 and side frames 20, specifically the rigid linkage between the rearward termini of cross members 22 and respective side frames 20 (except with respect to pivotal motion in the single plane defined by cross members 22), and the sliding, linkage between the forward termini of cross members 22 and side frames 20, permit easy, on-the-fly contraction and expansion of the wheelchair 10's width, yet ably support side frames 20 in the desired, parallel orientation shown in all the figures as against forces which would tend to collapse the side frames 20 under torque applied by the weight of a rider. No other known design affords these capabilities simultaneously. Chairs of known designs either expand and contract in increments effected by complex and semi-permanent adjustments between uses of the chairs, or provide very unstable frame characteristics. Only the X frame design disclosed herein provides a stable, easy to use chair with on-the-fly adjustment of chair width.

Figure 5:
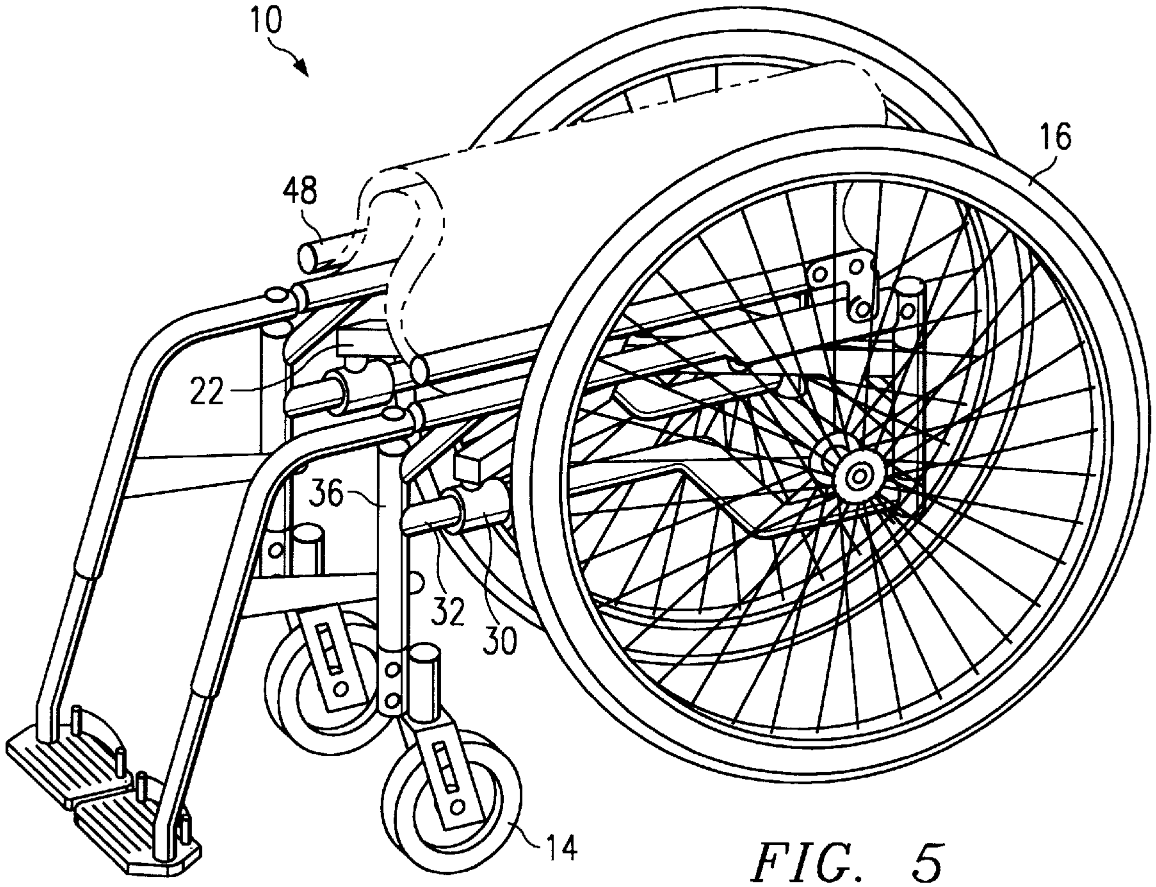
FIG. 5 is a perspective view of the wheelchair in the fully contracted configuration.

Referring to FIG. 5, not only do wheelchairs of the present design facilitate ease of use in areas where conventional chairs may not operate, or may be operated only with extreme difficulty for the rider, when configured to include convertible seat back posts 48, wheelchair 10 may be much more easily moved into a compact configuration for transportation, such as in a car trunk, airliner closet, etc. Unlike chairs of old designs which provide for some form of collapsing for storage or transportation, wheelchairs of the present design require no actuation of latches or releases to collapse frame 12 into the most compact configuration. One merely continues movement of side frames 12 toward the extreme of the contraction-directed movement, and flips the seat back posts 48 toward their downward orientation, and the chair is in its compact configuration. Restoring chair 10 to its in-use configuration is just as easily accomplished by reversing the foregoing process.

Although the invention has been described with reference to specific embodiments, this description is not meant to be construed in a limited sense. In particular, it should be recognized that a three-wheeled vehicle could be designed through practice of the present invention. One version of such a vehicle (not shown in the drawings) might exhibit forward terminal segments 32 of each of the horizontal segments 32 which converge to join with a single forward wheel assembly 36. Provided a sufficient length of the forward terminal segments 32 remain straight before any convergence, to enable normal interaction with the cross member carriages 30, the same forward and rearward movement as is demonstrated for the two forward wheel assemblies 36 in the preferred embodiment will be seen with a single forward wheel assembly 36.

Various other modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. An apparatus for use as a wheelchair frame, comprising:

a first side frame, the first side frame comprising a first horizontal segment and a first terminal segment;

a second side frame, the second side frame positioned substantially parallel to the first side frame at a width apart from the first side frame, the second side frame comprising a second horizontal segment and a second terminal segment;

a first cross member pivotally coupled to the first side frame and slidingly engaged to the second side frame;

a second cross member pivotally coupled to the second side frame and slidingly engaged to the first side frame, the second cross member engaged to the first cross member in an X configuration disposed horizontally with respect to the first side frame and the second side frame, the second cross member substantially co-planar with the first cross member;

a first cross member carriage coupled between the first cross member and the second horizontal segment, the first cross member carriage slidingly engaged to the second horizontal segment;

a second cross member carriage coupled between the second cross member and the first horizontal segment, the second cross member carriage slidingly engaged to the first horizontal segment; and wherein the first terminal segment prevents the second cross member carriage from sliding beyond the first horizontal segment and the second terminal segment prevents the first cross member carriage from sliding beyond the second horizontal segment.

2. The apparatus of claim 1, wherein the first cross member engages the second cross member at a point of intersection.

3. The apparatus of claim 2, further comprising a hub at the point of intersection, the first and second cross members operable to pivot about the hub in a scissor-like configuration as the width changes.

4. The apparatus of claim 1, further comprising:

a first caster wheel coupled proximate to a forward section of the first side frame;

a first primary wheel coupled proximate to a rearward section of the first side frame;

a second caster wheel coupled proximate to a forward section of the second side frame; and a second primary wheel coupled proximate to a rearward section of the second side frame.

5. The apparatus of claim 1, wherein;

the first cross member is pivotally coupled to the first side frame proximate a rearward section of the first side frame; and further wherein the second cross member is pivotally coupled to the second side frame proximate a rearward section of the second side frame.

6. The apparatus of claim 1, wherein the first side frame and the second side frame include a vertical segment, the apparatus further comprising:

a first anchor sleeve formed to receive a portion of the vertical segment of the first side frame, the first anchor sleeve pivotally engaged to the first side frame and fixedly coupled to the first cross member; and a second anchor sleeve formed to receive a portion of the vertical segment of the second side frame, the second anchor sleeve pivotally engaged to the second side frame and fixedly coupled to the second cross member.

7. The apparatus of claim 1, wherein the first cross member and the second cross member comprise a non-linear top profile.

8. A method for assembling a wheelchair frame, comprising;

providing a first side frame, the first side frame comprising a first horizontal segment and a first terminal segment and a second side frame, the second side frame comprising a second horizontal segment and a second terminal segment;

positioning the second side frame substantially parallel to the first side frame at a width apart from the first side frame;

coupling a first cross member such that it is pivotally coupled to the first side frame and slidingly engaged to the second side frame;

coupling a second cross member such that it is pivotally coupled to the second side frame and slidingly engaged to the first side frame, the second cross member engaged to the first cross member in an X configuration disposed horizontally with respect to the first side frame and the second side frame, the second cross member substantially co-planar with the first cross member;

coupling a first cross member carriage coupled between the first cross member and the second horizontal segment, the first cross member carriage slidingly engaged to the second horizontal segment;

coupling a second cross member carriage coupled between the second cross member and the first horizontal segment, the second cross member carriage slidingly engaged to the first horizontal segment; and wherein the first terminal segment prevents the second cross member carriage from sliding beyond the first horizontal segment and the second terminal segment prevents the first cross member carriage from sliding beyond the second horizontal segment.

9. The method of claim 8, further comprising coupling a hub the first and second cross members at the point of intersection, the first and second cross members operable to pivot about the hub in a scissor-like configuration as the width changes.

10. The method of claim 8, further comprising:

coupling a first caster wheel proximate to a forward section of the first side frame;

coupling a first primary wheel proximate to a rearward section of the first side frame;

coupling a second caster wheel proximate to a forward section of the second side frame; and coupling a second primary wheel proximate to a rearward section of the second side frame.

11. The method of claim 8, wherein:

the first cross member is pivotally coupled to the first side frame proximate a rearward section of the first side frame; and further wherein the second cross member is pivotally coupled to the second side frame proximate a rearward section of the second side frame.

12. The method of claim 8, further comprising:

coupling a first anchor sleeve between the first cross member and the first side frame, the first anchor sleeve pivotally engaged to the first side frame and fixedly engaged to the first cross member; and coupling a second anchor sleeve between the second cross member and the second side frame, the second anchor sleeve pivotally engaged to the second side frame and fixedly engaged to the second cross member.

* * * * *